(12) United States Patent
Gao et al.

(10) Patent No.: US 7,554,365 B2
(45) Date of Patent: Jun. 30, 2009

(54) GLITCH-FREE CLOCK SWITCHING CIRCUIT

(75) Inventors: Peng Gao, Beijing (CN); Dejian Li, Beijing (CN); Yu Huang, Beijing (CN)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 12/045,725

(22) Filed: Mar. 11, 2008

(65) Prior Publication Data

US 2008/0258794 A1 Oct. 23, 2008

(30) Foreign Application Priority Data

Apr. 20, 2007 (CN) .......................... 2007 1 0098243

(51) Int. Cl.
*H03K 17/00* (2006.01)
(52) U.S. Cl. .......................... 327/99; 327/34; 327/291; 327/298
(58) Field of Classification Search .................. 327/99, 327/407–413, 34, 291–295, 298
See application file for complete search history.

(56) References Cited

U.S. PATENT DOCUMENTS

| 5,717,729 | A | * | 2/1998 | Iknaian et al. | ............... | 375/356 |
| 6,239,626 | B1 | * | 5/2001 | Chesavage | .................... | 327/99 |
| 6,600,345 | B1 | * | 7/2003 | Boutaud | ...................... | 327/99 |
| 2007/0273410 | A1 | * | 11/2007 | Miike | .......................... | 327/99 |

* cited by examiner

*Primary Examiner*—Long Nguyen
*Assistant Examiner*—Sibin Chen
(74) *Attorney, Agent, or Firm*—Thomas, Kayden, Horstemeyer & Risley

(57) ABSTRACT

A glitch-free clock switching circuit receives a first clock signal and a second clock signal and outputs a third clock signal corresponding to the first clock signal or a fourth clock signal corresponding to the second clock signal according to a clock switching signal. The glitch-free clock switching circuit switches to output clock signals by stopping output of a clock signal, and then waiting for a predetermined period of time before outputting another clock signal.

18 Claims, 5 Drawing Sheets

US 7,554,365 B2

GLITCH-FREE CLOCK SWITCHING CIRCUIT

BACKGROUND OF THE INVENTION

1. Field of the Invention

The invention relates to a clock switching circuit, and in particular relates to a glitch-free clock switching circuit and method thereof.

2. Description of the Related Art

Due to improved integrated circuit technology, increased integrated circuit application and consumer demand, more and more circuits are being required within an integrated circuit. As a result, one important issue for integrated circuit designers is the control of power consumption, of which, the clock switching circuit plays an important role. Generally, computer systems or communication systems have a plurality of clock signals with different frequencies. For example, some applications require very high frequency signals and other applications require low frequency signals. Thus, to efficiently control system performance and power consumption, the system usually uses clock switching circuits to change different clock signal frequencies for different applications.

FIG. 1 shows a conventional clock switching circuit. The clock switching circuit can be a multiplexer. The multiplexer receives clock signals CLK_A and CLK_B and outputs one of them according to a control signal SEL. For example, when the control signal SEL is 0, the multiplexer outputs the signal CLK_OUT as the clock signal CLK_A. When the control signal SEL is 1, the multiplexer outputs the signal CLK_OUT as the clock signal CLK_B. However, if clock signals CLK_A and CLK_B have different voltage levels, when the multiplexer switches, the multiplexer will generate glitch signals. As shown in FIG. 2, when the control signal SEL changes the voltage level, the clock signal CLK_A is at a rising edge and the clock signal CLK_B is at low voltage level. At which time, the multiplexer will generate a pulse signal (glitch signal characterized as a dotted line) when the multiplexer switches to output different clock signals. The pulse signal causes synchronization failure or lost of data, and may even cause system failure.

BRIEF SUMMARY OF THE INVENTION

A detailed description is given in the following embodiments with reference to the accompanying drawings.

An embodiment of a clock switching circuit for switching a first clock signal and a second clock signal is provided. The clock switching circuit comprises a clock switching control device, a multiplexer, a first clock gate control unit, a second clock gate control unit, a first synchronization device, and a second synchronization device. The clock switching control device generates a clock switching storing signal (mux_sel), a first enable signal (clk_a_gat_en) and a second enable signal (clk_b_gat_en) according to a clock switching signal (clk_sel). The multiplexer determines whether to output a third clock signal (clk_a_gated) or a fourth clock signal (clk_b_gated) according to the clock switching storing signal. The first clock gate control unit receives the first clock signal and determines whether to output the third clock signal (clk_a_gated) corresponding to the first clock signal and a first gate enable signal (clk_a_gat_en_f) according to the first enable signal (clk_a_gat_en). The second clock gate control unit receives the second clock signal and determines whether to output the fourth clock signal (clk_b_gated) corresponding to the second clock signal and a second gate enable signal (clk_b_gat_en_f) according to the second enable signal (clk_b_gat_en). The first synchronization device synchronizes the first gate enable signal to generate a first feedback enable signal (syncback_clk_a_gat_en) to the clock switching control device according to a reference clock (clk). The second synchronization device synchronizes the second gate enable signal to generate a second feedback enable signal (syncback_clk_b_gat_en) to the clock switching control device according to the reference clock (clk).

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
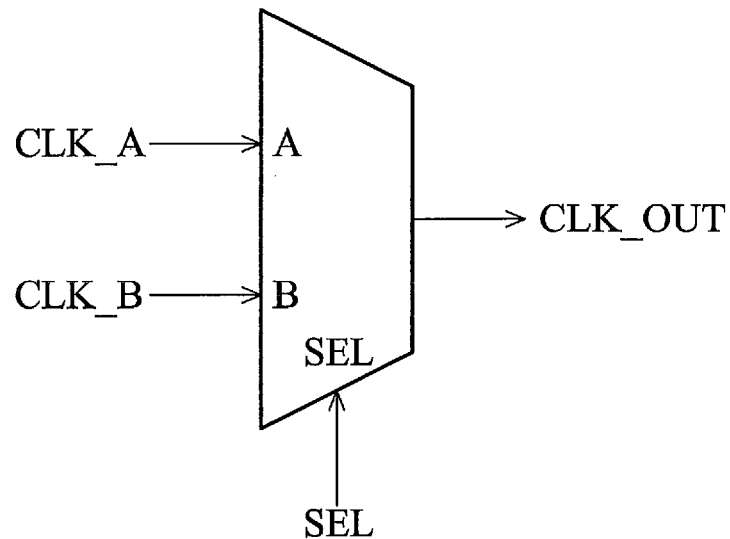
FIG. 1 shows a conventional clock switching circuit.
Figure 2:
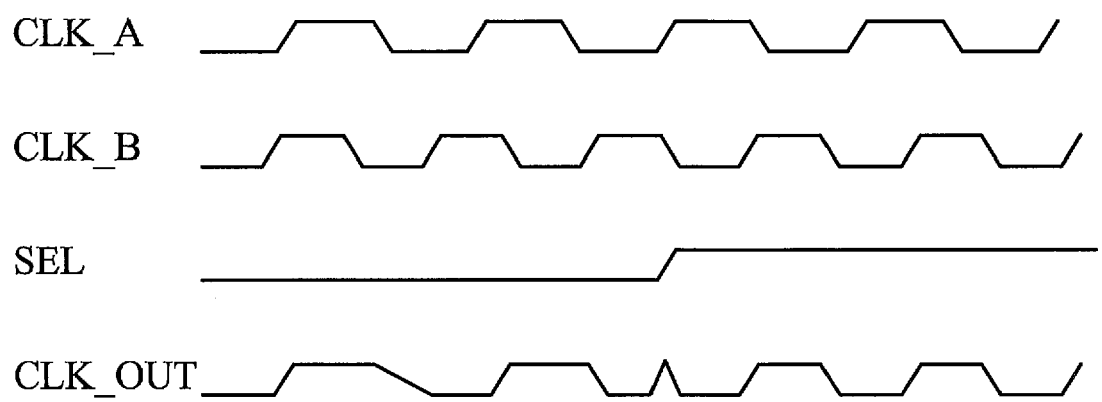
FIG. 2 shows a signal diagram of a conventional clock switching circuit.
Figure 3:
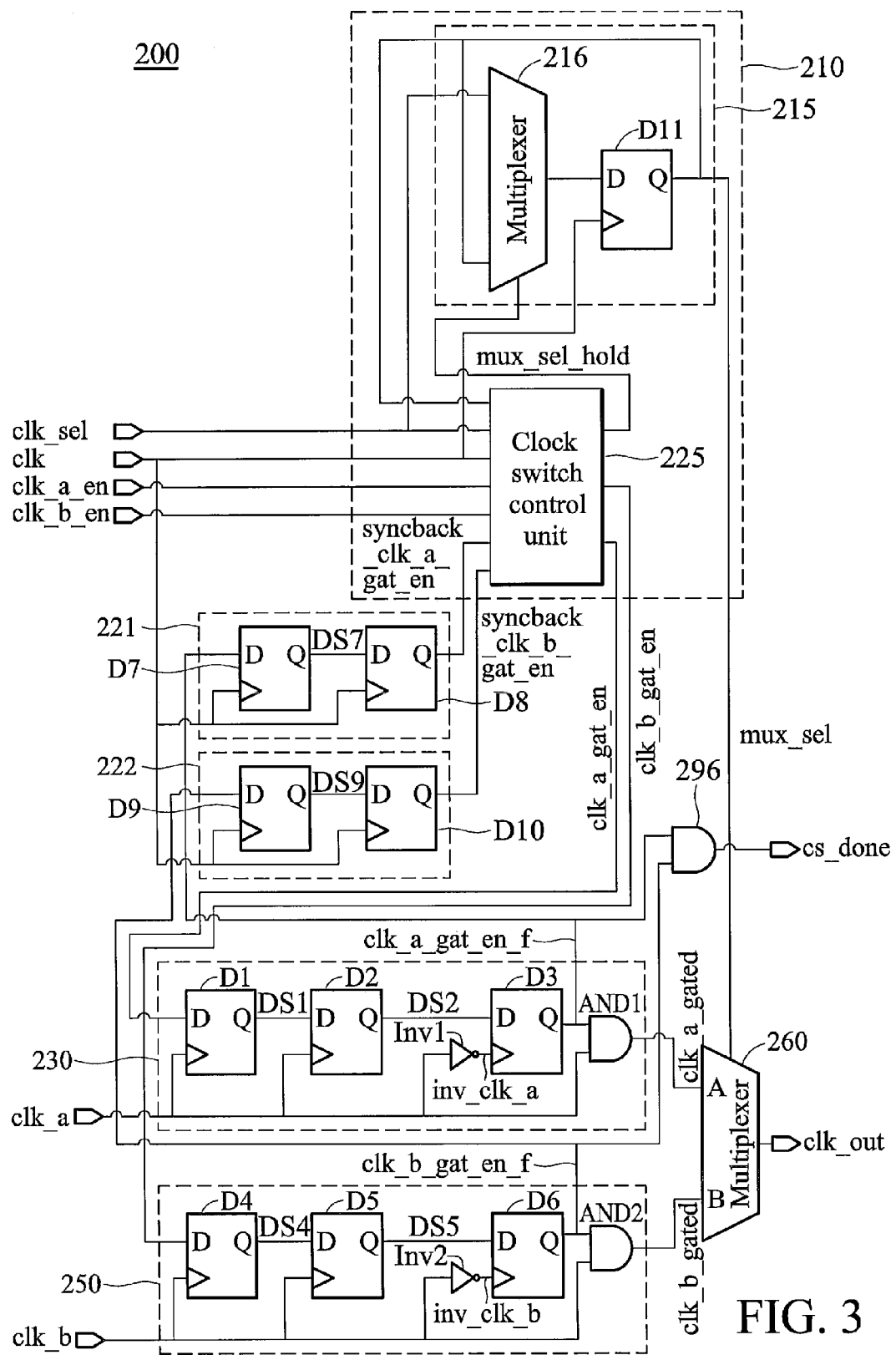
FIG. 3 shows a clock switching circuit according to an embodiment of the invention.

FIG. 3 shows a clock switching circuit 200 according to an embodiment of the invention. The clock switching circuit 200 comprises a clock switching control device 210, an AND logic gate 296, a multiplexer 260, clock gate control units 230 and 250, and synchronization devices 221 and 222. The clock switching circuit 200 receives a first clock signal clk_a and a second clock signal clk_b and outputs a third clock clk_a_gated signal or a fourth clock signal clk_b_gated as a clock output signal clk_out according to a clock switching signal. The third clock signal clk_a_gated corresponds to the first clock signal clk_a and the fourth clock signal clk_b_gated corresponds to the second clock signal clk_b. Note that the clock switching circuit 200 is prevented from generating glitch signals since the clock switching circuit 200 switches to output clock signals when the third clock signal clk_a_gated or the fourth clock signal clk_b_gated is stable.

The clock switching control device 210 comprises a storing unit 210 and a clock switching control unit 225. The clock switching control unit 225 outputs a first enable signal clk_a_gat_en, a second enable signal clk_b_gat_en and a storing signal mux_sel_hold according to a clock switching signal clk_sel, a reference clock signal clk, a first clock enable signal clk_a_en, a second clock enable signal clk_b_en, a first feedback enable signal syncback_clk_a_gat_en, and a second feedback enable signal syncback_clk_b_gat_en. The storing unit 210 comprises a first multiplexer 216 and a flip flop D11. The first multiplexer 216 receives the clock switching signal clk_sel and a clock switching storing signal mux_sel and outputs one of them to the flip flop D11 according to the storing signal mux_sel_hold. The flip flop D11 receives the reference clock signal clk and a signal from the first multiplexer 216 to output the clock switching storing signal mux_sel.

The clock gate control unit 230 determines whether to output the third clock signal clk_a_gated corresponding to the first clock signal clk_a according to the first enable signal clk_a_gat_en. When the first enable signal clk_a_gat_en is 1, the clock gate control unit 230 outputs the third clock signal clk_a_gated to the multiplexer 260 after a predetermined period of time. When the first enable signal clk_a_gat_en is 0, the clock gate control unit 230 stops output of the third clock signal clk_a_gated to the multiplexer 260 for a predetermined period of time.

The clock gate control unit 230 comprises a first flip flop D1, a second flip flop D2, a third flip flop D3, a first inverter Inv1 and a first AND logic gate AND1. The first flip flop D1 outputs a first flip flop signal DS1 according to the first enable signal clk_a_gat_en and the first clock signal clk_a. The second flip flop D2 outputs a second flip flop signal DS2 according to the first flip flop signal DS1 and the first clock signal clk_a. The first inverter Inv1 inverts the first clock signal clk_a to generate an inverting first clock signal inv_clk_a. The third flip flop D3 generates a first gate enable signal clk_a_gat_en_f according to the second flip flop signal DS2 and the inverting first clock signal inv_clk_a. The first AND gate logic gate AND1 outputs the third clock signal clk_a_gated corresponding to the first clock signal clk_a according to the first gate enable signal clk_a_gat_en_f and the first clock signal clk_a.

The clock gate control units 250 and 230 are similar. The clock gate control unit 250 determines whether to output the fourth clock signal clk_b_gated corresponding to the second clock signal clk_b to multiplexer 260 according to the second enable signal clk_b_gat_en. When the second enable signal clk_b_gat_en is 1, the clock gate control unit 250 outputs the fourth clock signal clk_b_gated to the multiplexer after a predetermined period of time. When the second enable signal clk_a_gat_en is 0, the clock control gate unit 250 stops output of the fourth clock signal clk_b_gated to the multiplexer 260 for a predetermined period of time.

The clock gate control unit 250 comprises a fourth flip flop D4, a fifth flip flop D5. a second inverter Inv2, a sixth flip flop D6 and a second AND logic gate AND2. The fourth flip flop generates a fourth flip flop signal DS4 according to the second enable signal clk_b_gat_en and the second clock signal clk_b. The fifth flip flop D5 generates a fifth flip flop signal DS5 according to the fourth flip flop signal DS4 and the second clock signal clk_b. The second inverter Inv2 inverts the second clock signal clk_b to generate an inverting second clock signal inv_clk_b. The sixth flip flop D6 generates the second gate enable signal clk_b_gat_en_f according to the fifth flip flop signal DS5 and the inverting second clock signal inv_clk_b. The second AND logic gate AND2 outputs the fourth clock signal clk_b_gated corresponding to the second clock signal clk_b according to the second gate enable signal clk_b_gat_en_f and the second clock signal clk_b.

The synchronization device 221 synchronizes the first gate enable signal clk_a_gat_en_f to generate the first feedback enable signal syncback_clk_a_gat_en to the clock switching control device 210 according to the reference clock clk. The synchronization device 221 comprises a seventh flip flop D7 and an eighth flip flop D8. The seventh flip flop D7 generates a seventh flip flop signal DS7 according to the first enable gate signal clk_a_gat_en_f and the reference clock signal clk. The eighth flip flop D8 generates the first feedback enable signal syncback_clk_a_gat_en to the clock switching control unit 225 of the clock switching control device 210 according to seventh flip flop signal DS7 and the reference clock signal clk.

The synchronization device 222 synchronizes the second gate enable signal clk_b_gat_en_f to generate the second feedback enable signal syncback_clk_b_gat_en to the clock switching control device 210 according to reference clock signal clk. The synchronization device 222 comprises a ninth flip flop D9 and a tenth flip flop D10. The ninth flip flop generates a ninth flip flop signal DS9 according to the second gate enable signal clk_b_gat_en_f and the reference clock signal clk. The tenth flip flop D10 generates the second feedback enable signal syncback_clk_b_gat_en to the clock switching control unit 225 of the clock switching control device 210 according to the ninth flip flop signal DS9 and the reference clock signal clk.

The multiplexer 260 determines to output the clock output signal clk_out as the third clock signal or the fourth clock signal clk_b_gated according to the clock switching storing signal mux_sel. The AND logic gate 296 generates a switch done signal cs_done for the system determining whether switching is completed according to the first gate enable signal clk_a_gat_en_f and the second gate enable signal clk_b_gat_en_f.

Table 1 shows switching conditions and output signals of the clock switching control unit 225.

TABLE 1

| condition | Current Status | Next Status | Status Switch Condition | output signal | | |
|---|---|---|---|---|---|---|
| | | | | mux_sel_hold | clk_a_gat_en | clk_b_gat_en |
| S1 | Idle Status | Switch Status | ((mux_sel!=clk_sel) &(syncback_clk_a_gat_en\| syncback_clk_b_gat_en)) | 1 | clk_a_en | clk_b_en |
| S2 | Idle Status | Idle Status | !((mux_sel!=clk_sel) &(syncback_clk_a_gat_en\| syncback_clk_b_gat_en)) | 0 | clk_a_en | clk_b_en |
| S3 | Switch Status | Idle Status | !(syncback_clk_a_gat_en\| syncback_clk_b_gat_en) | 0 | 0 | 0 |
| S4 | Switch Status | Switch Status | (syncback_clk_a_gat_en\| syncback_clk_b_gat_en) | 1 | 0 | 0 |

The clock switching control unit 225 operates in an idle status or switch status according to the clock switching storing signal mux_sel, the clock switching signal clk_sel, the first feedback enable signal syncback_clk_a_gat_en and the second feedback enable signal syncback clk_b_gat_en.

Referring to condition S1 of Table 1. When ((mux_sel!=clk_sel)& (syncback_clk_a_gat_en|syncback_clk_b_gat_en)) is true, the clock switching control unit 225 switches operation from the idle status to the switch status, the storing signal equals to one (mux_sel_hold=1), the first enable signal equals to the first clock enable signal (clk_a_gat_en=clk_a_en), and the second enable signal equals to the second clock enable signal (clk_b_gat_en=clk_b_en). Furthermore, when the clock switching storing does not equal to the clock switching signal (mux_sel!=clk_sel), the system is requested to operate in switch status. Meanwhile, if at least one of the first feedback enable signal syncback_clk_a_gat_en or the second feedback enable signal syncabck_clk_b_gat_en is enabled, the clock switching control unit 225 outputs the storing signal mux_sel_hold as one (mux_sel_hold=1). If the storing unit 215 receives the storing signal mux_sel_hold equaling to one (mux_sel_hold=1), the storing unit 215 continues to output the original clock switching storing signal mux_sel and the multiplexer 260 does not switch status.

Referring to condition S2 of Table 1. When !((mux_sel!=clk_sel)& (syncback_clk_a_gat_en|syncback_clk_b_gat_en)) is true, the clock switching control unit 225 will continuously operate in the idle status, the storing signal equals to zero (mux_sel_hold=0), the first enable signal equals to the first clock enable signal (clk_a_gat_en=clk_a_en), and the second enable signal equals to the second clock enable signal (clk_b_gat_en=clk_b_en). Furthermore, when the clock switching storing equals to the clock switching signal (mux_sel=clk_sel), the system does not need to operate in switch status. Thus, the clock switching control unit 225 outputs the storing signal mux_sel_hold as zero (mux_sel_hold=0), outputs the first enable signal clk_a_gat_en according to the first clock enable signal clk_a_en and outputs the second enable signal clk_b_gat_en according to the second clock enable signal clk_b_en. On the other hand, if both the first feedback enable signal syncback_clk_a_gat_en and the second feedback enable signal syncback_clk_b_gat_en are disabled, the clock signal received by the multiplexer 260 is stable. Note that at this time, the system can directly switch clock signals. The storing signal mux_sel_hold output by the clock switching control unit 225 is disabled (mux_sel_hold=0).

Referring to condition S3 of Table 1. When !(syncback_clk_a_gat_en|syncback_clk_b_gat_en) is true, the clock switching control unit 225 switches operation from the switch status to the idle status, the storing signal equals to zero (mux_sel_hold=0), the first enable signal equals to zero (clk_a_gat_en=0), and the second enable signal equals to zero (clk_b_gat_en=0). If both the first feedback enable signal syncback_clk_a_gat_en and the second feedback enable signal syncback_clk_b_gat_en are disabled, the clock switching control unit 225 will output the storing signal mux_sel_hold as zero (mux_sel_hold=0). Note that the storing unit 215 refreshes the clock switching storing signal mux_sel to switch clock signals according to the clock selecting signal clk_sel.

Referring to condition S4 of Table 1. When (syncback_clk_a_gat_en|syncback_clk_b_gat_en) is true, the clock switching control unit 225 will continuously operate in the switch status, the storing signal equals to one (mux_sel_hold=1), the first enable signal equals to zero (clk_a_gat_en=0), and the second enable signal equals to zero (clk_b_gat_en=0). Similarly, if both the first feedback enable signal syncback_clk_a_gat_en and the second feedback enable signal syncback_clk_b_gat_en are not disabled simultaneously, the clock switching control unit 225 will enable the storing signal mux_sel_hold such that the storing unit 215 will continuously output the original clock switching storing signal mux_sel. In addition, the clock switching control unit 225 would disable the first enable signal clk_a_gat_en and the second enable signal clk_b_gat_en and respectively output them to the clock gate control units 230 and 250 so that the third clock signal clk_a_gated and the fourth clock signal clk_b_gated received by the multiplexer 260 are stable.

Figure 4:
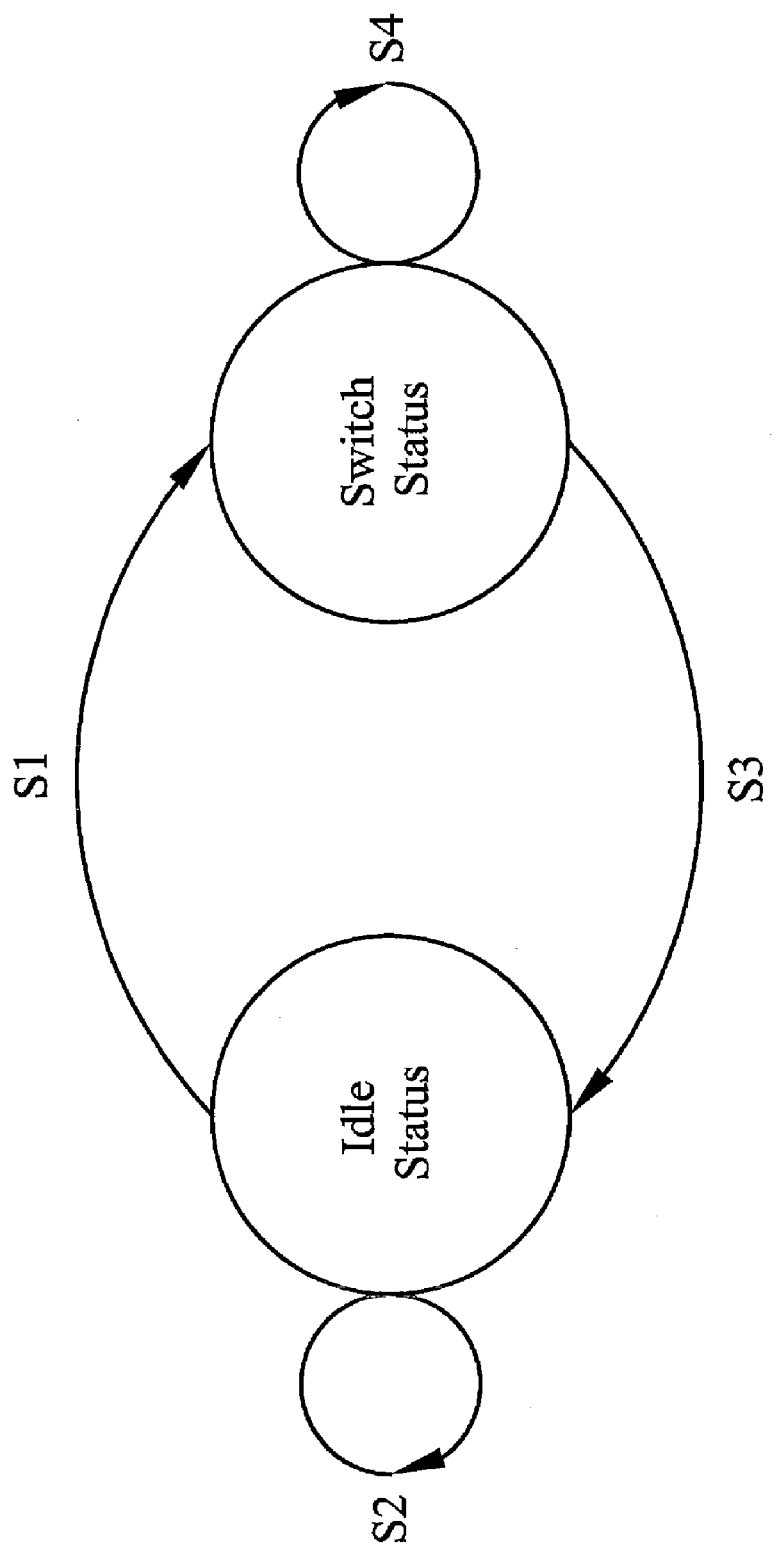
FIG. 4 shows a state switch schematic diagram of the clock switching control unit according to an embodiment of the invention.

FIG. 4 shows a state switch schematic diagram of the clock switching control unit 225 according to an embodiment of the invention. The condition S1 is switching from the idle status to the switch status. The condition S2 is the continuously idle status. The condition S3 is switching from the switch status to the idle status. The condition S4 is the continuously switch status.

Figure 5:
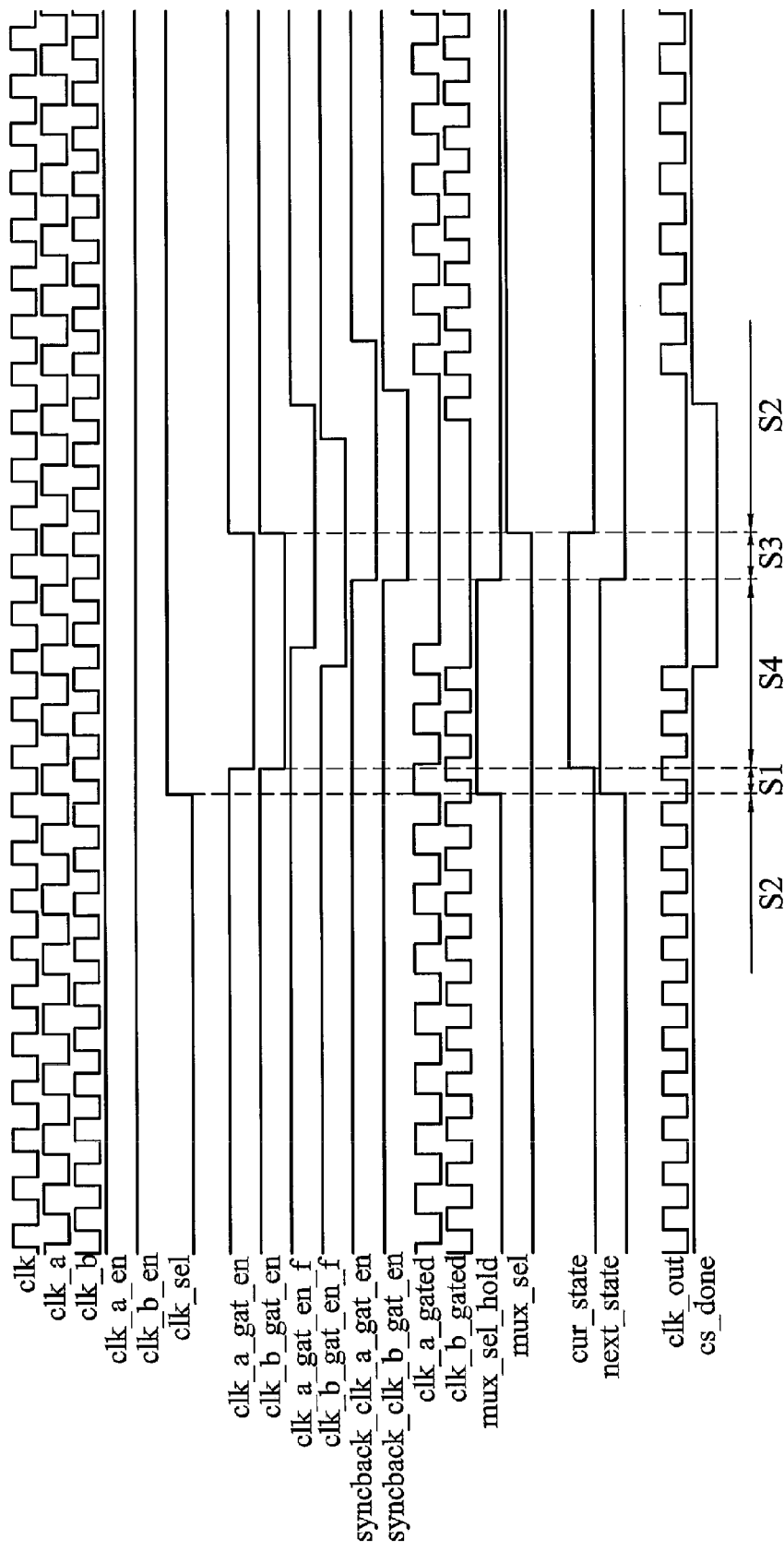
FIG. 5 shows a signal diagram of the clock switching circuit according to an embodiment of the invention.

FIG. 5 shows a signal diagram of the clock switching circuit 200 according to an embodiment of the invention. When the clock switching signal clk_sel is 0, the clock output signal clk_out is the fourth clock signal clk_b_gated corresponding to the second clock signal clk_b. When the clock switching signal clk_sel is 1, the clock output signal clk_out is the third clock signal clk_a_gated corresponding to the first clock signal clk_a. When the clock switching control unit 225 detects changes of the clock switching signal clk_sel, the clock switching unit 225 switches operation from the idle status to the switch status, entering into the condition S1. The following step enters into the condition S4. The first enable signal clk_a_gat_en and the second enable signal clk_b_gat_en output from the clock switching control device 210 change from the high voltage level to the low voltage level to control the first clock gate unit 230 and the second clock gate unit 250 to stop output of the third clock signal clk_a_gated and the fourth clock signal clk_b_gated to multiplexer 260. When the first feedback enable signal syncback_clk_a_gat_en and the second feedback enable signal syncback_clk_b_gat_en received by the clock switching control device 210 changes to the low voltage level, the clock switching unit 225 enters into the condition S3. The multiplexer 260 will change output signals according to the clock switching storing signal mux_sel and then the clock switching unit 225 enters into the condition S2. The clock switching control device 210 outputs the first enable signal clk_a_gat_en according to the first clock enable signal clk_a_en and outputs the second enable signal clk_b_gat_en according to the second clock enable signal clk_b_en. Then, the clock gate control units 230 and 250 respectively outputs the third clock signal clk_a_gated and the fourth clock signal clk_b_gated to the multiplexer 260.

Figure 6:
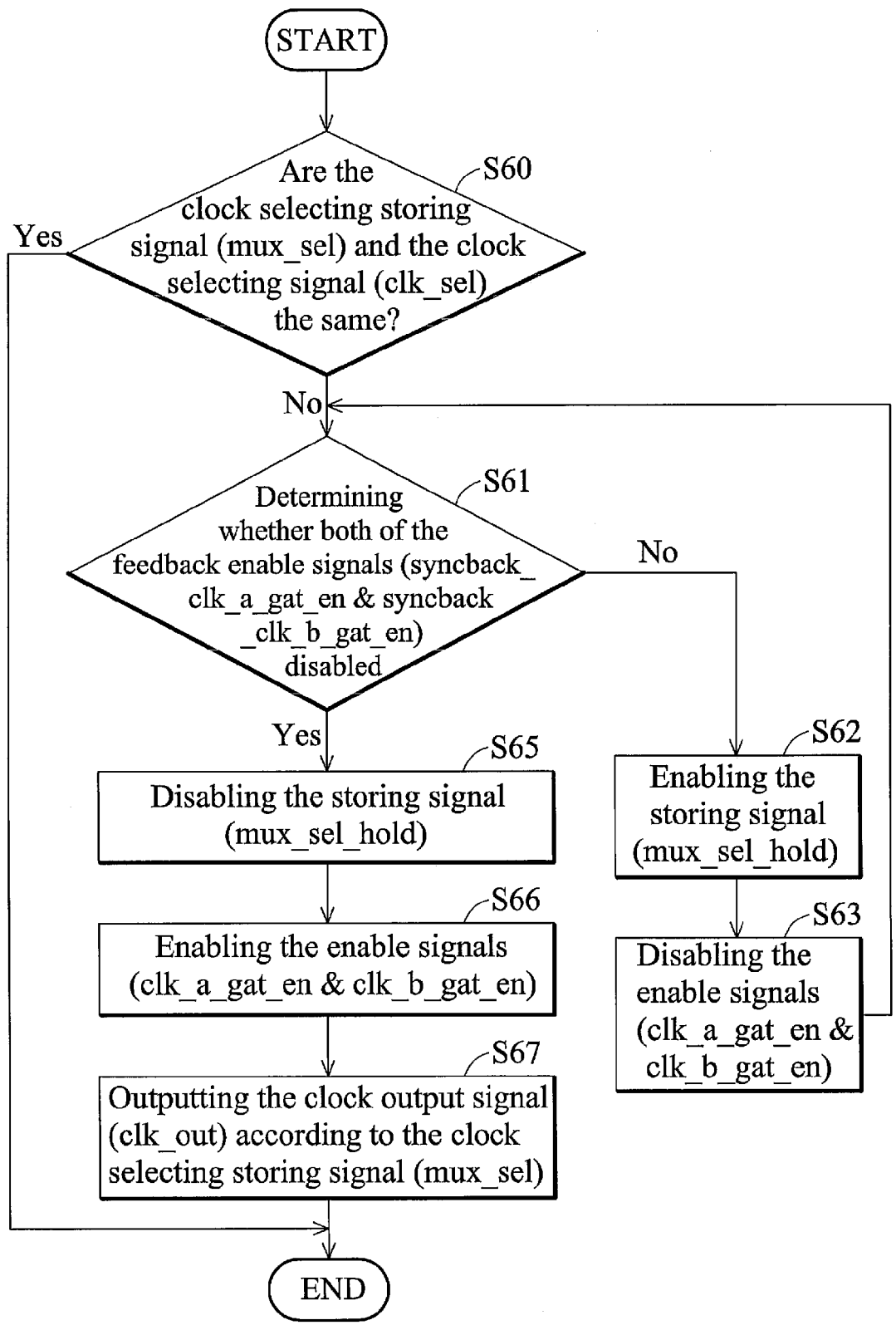
FIG. 6 shows a clock switching method according to an embodiment of the invention.

FIG. 6 shows a clock switching method according to an embodiment of the invention. Please refer to FIGS. 4 and 5 simultaneously. When the system operates normally, the system will select one of the first clock signal clk_a or the second clock signal clk_b to output as the clock output signal clk_out. Meanwhile, the clock switching control device 210 will output the clock switching storing signal mux_sel to control the multiplexer 260 to select output of a corresponding clock signal according to the clock switching signal clk_sel.

Next, the system will begin at the start of the Steps of FIG. 6. The clock switching circuit 200 determines whether the clock switching storing signal mux_sel and the clock switching signal clk_sel are the same (step S60). If they are the same, the clock switching circuit 200 remains in the condition S2.

When the clock switching storing signal mux_sel and the clock switching signal clk_sel are different, the clock switching circuit 200 needs to switch clock signals. Next, the clock switching circuit 210 determines whether the feedback enable signals syncback_clk_a_gat_en and syncback_clk_b_gat_en are disabled (step S61). If one of the feedback enable signals syncback_clk_a_gat_en or syncback_clk_b_gat_en are not disabled, the clock switching circuit 210 will go to Step S62 to enable the storing signal mux_sel_hold and then go to Step S63 to disable the enable signals clk_a_gat_en and clk_b_gat_en. Then, clock switching circuit 210 will return to Step S61 and go to the condition S1 and then on to the condition S4. For Step S62 (enabling the storing signal mux_sel_hold), the clock switching control unit 225 enables and outputs the storing signal mux_sel_hold. For Step S63 (disabling the enable signal), the clock switching control unit 225 disables the first enable signal clk_a_gat_en and the second enable signal clk_b_gat_en and respectively outputs them to the clock gate control unit 230 and 250. Following, the clock gate control unit 230 and 250 will stop output of the third clock signal clk_a_gated and the fourth clock signal clk_b_gated to the multiplexer 260.

If the determined result of Step S61 is that both feedback enable signals are disabled, the clock switching circuit 200 will go to Step S65 to disable the storing signal mux_sel_hold, go to Step S66 to enable the enable signals clk_a_gat_en and clk_b_gat_en and then go to Step 67 to output the corresponding clock output signal clk_out according to the clock switching storing signal mux_sel. For Step S65, the clock switching control unit 225 disables and outputs the storing signal mux_sel_hold such that the storing unit 215 refreshes the clock switching storing signal mux_sel. For Step S66, the clock switching control unit 225 enables the first enable signal clk_a_gat_en and the second enable signal clk_b_gat_en such that the clock gate control units 230 and 250 respectively output the third clock signal clk_a_gated and the fourth clock signal clk_b_gated according to the first clock signal clk_a and the second clock signal clk_b. For Step S67, the multiplexer 260 selects and outputs the corresponding output signal according to the new clock switching storing signal mux_sel. The above Steps S65, S66 and S67 are the clock switching circuit at the condition S3.

FIG. 6 schematically shows one time clock switching flow chart. After the clock switching circuit completes the above Steps for switching clock signals, the system can return to the start Step to repeat the above Steps again. Specifically, the clock switching circuit will return to the condition S2. Meanwhile, note that the order of the above Steps is not limited. For example, Step S66 and Step S67 can be completed at the same time.

In the above embodiment, the clock switching circuit 210 operates according to the received reference clock signal clk. The reference clock signal clk may or may not be synchronized with the first clock signal clk_a and the second clock signal clk_b. In addition, during switching of clock signals, the third clock signal clk_a_gated and the fourth clock signal clk_b_gated of the clock gate control units 230 and 250 are at low voltage levels. However, the third clock signal clk_a_gated and the fourth clock signal clk_b_gated may also be at high voltage levels. When the clock gate control units 230 and 250 receives the disabled (at low voltage level) enable signals clk_a_gat_en and clk_b_gat_en, the clock gate control units 230 and 250 will output the stable third clock signal clk_a_gated or the stable fourth clock signal clk_b_gated. When the third clock signal clk_a_gated and the fourth clock signal clk_b_gated are stable, the multiplexer 260 will switch clock signals.

According to the above description, the invention has some of the following advantages:

1. Occurrence of pulse signals are prevented during switching of clock signals.
2. More flexibility for circuit designers as clock signal synchronization is not required with regard to the clock switching circuit.
3. Normal operation of the clock switching circuit and other circuits by using the specific circuit to switch clock signals, even if the reference clock is not synchronized with the clock signals.

While the invention has been described by way of example and in terms of preferred embodiment, it is to be understood that the invention is not limited to thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clock switching circuit for switching a first clock signal and a second clock signal, comprising:
   a clock switching control device generating a clock switching storing signal (mux_sel), a first enable signal (clk_a_gat_en) and a second enable signal (clk_b_gat_en) according to a clock switching signal (clk_sel);
   a multiplexer determining whether to output a third clock signal (clk_a_gated) or a fourth clock signal (clk_b_gated) according to the clock switching storing signal;
   a first clock gate control unit receiving the first clock signal and determining whether to output the third clock signal (clk_a_gated) corresponding to the first clock signal and a first gate enable signal (clk_a_gat_en_f) according to the first enable signal (clk_a_gat_en);
   a second clock gate control unit receiving the second clock signal and determining whether to output the fourth clock signal (clk_b_gated) corresponding to the second clock signal and a second gate enable signal (clk_b_gat_en_f) according to the second enable signal (clk_b_gat_en);
   a first synchronization device synchronizing the first gate enable signal to generate a first feedback enable signal (syncback_clk_a_gat_en) to the clock switching control device according to a reference clock (clk); and
   a second synchronization device synchronizing the second gate enable signal to generate a second feedback enable signal (syncback_clk_b_gat_en) to the clock switching control device according to the reference clock (clk).

2. The clock switching circuit as claimed in claim 1, wherein the first clock gate control unit comprises:
   a first flip flop generating a first flip flop signal according to the first enable signal and the first clock signal;
   a second flip flop generating a second flip flop signal according to the first flip flop signal and the first clock signal;
   a first inverter inverting the first clock signal to generate an inverting first clock signal;
   a third flip flop generating the first gate enable signal according to the second flip flop signal and the inverting first clock signal; and
   a first AND logic gate outputting the third clock signal corresponding to the first clock signal according to the first gate enable signal and the first clock signal.

3. The clock switching circuit as claimed in claim 2, wherein the second clock gate control unit comprises:
   a fourth flip flop generating a fourth flip flop signal according to the second enable signal and the second clock signal;
   a fifth flip flop generating a fifth flip flop signal according to the fourth flip flop signal and the second clock signal;
   a second inverter inverting the second clock signal to generate an inverting second clock signal;

a sixth flip flop generating the second gate enable signal according to the fifth flip flop signal and the inverting second clock signal; and a second AND logic gate outputting the fourth clock signal corresponding to the second clock signal according to the second gate enable signal and the second clock signal.

4. The clock switching circuit as claimed in claim 3, further comprising an AND logic gate receiving the first gate enable signal and the second gate enable signal to generate a switch done signal (cs_done).

5. The clock switching circuit as claimed in claim 1, wherein the first synchronization device comprises:

a seventh flip flop generating a seventh flip flop signal according to the first gate enable signal and the reference clock signal; and an eighth flip flop generating the first feedback enable signal according to the seventh flip flop signal and the reference clock signal.

6. The clock switching circuit as claimed in claim 1, wherein the second synchronization device comprises:

a ninth flip flop generating a ninth flip flop signal according to the second gate enable signal and the reference clock signal; and a tenth flip flop generating the second feedback enable signal according to the ninth flip flop signal and the reference clock signal.

7. The clock switching circuit as claimed in claim 1, wherein the clock switching control device further comprises a storage unit and a clock switching control unit.

8. The clock switching circuit as claimed in claim 7, wherein the clock switching control unit generates the first enable signal, the second enable signal and a storage signal (mux_sel_hold) according to the clock switching signal, the reference clock signal, the first feedback enable signal and the second feedback enable signal.

9. The clock switching circuit as claimed in claim 8, wherein the storage unit comprises a first multiplexer and an eleventh flip flop, and wherein the first multiplexer receives the clock switching signal and the clock switching storing signal and determines whether to output the clock switching signal or the clock switching storing signal to the eleven flip flop according to the storing signal, and the eleventh flip flop generates the clock switching storing signal according to the reference clock signal and an output signal from the first multiplexer.

10. The clock switching circuit as claimed in claim 8, wherein the clock switching control unit further receives a first clock enable signal (clk_a_en) and a second clock enable signal (clk_b_en).

11. The clock switching circuit as claimed in claim 1, wherein the clock switching control device operates at an idle status or a switch status.

12. The clock switching circuit as claimed in claim 10, wherein the clock switching control unit operates at an idle status or a switch status.

13. The clock switching circuit as claimed in claim 12, wherein when ((mux_sel!=clk_sel) & (syncback_clk_a_gat_en|syncback_clk_b_gat_en)) is true, the clock switching control unit switches operation from the idle status to the switch status, the storing signal equals to one (mux_sel_hold=1), the first enable signal equals to the first clock enable signal (clk_a_gat_en=clk_a_en), and the second enable signal equals to the second clock enable signal (clk_b_gat_en=clk_b_en).

14. The clock switching circuit as claimed in claim 12, wherein When !((mux_sel!=clk_sel) & (syncback_clk_a_gat_en|syncback_clk_b_gat_en)) is true, the clock switching control unit continuously operates in the idle status, the storing signal equals to zero (mux_sel_hold=0), the first enable signal equals to the first clock enable signal (clk_a_gat_en=clk_a_en), and the second enable signal equals to the second clock enable signal (clk_b_gat_en=clk_b_en).

15. The clock switching circuit as claimed in claim 12, wherein when !(syncback_clk_a_gat_en|syncback_clk_b_gat_en) is true, the clock switching control unit switches operation from the switch status to the idle status, the storing signal equals to zero (mux_sel_hold=0), the first enable signal equals to zero (clk_a_gat_en=0), and the second enable signal equals to zero (clk_b_gat_en=0).

16. The clock switching circuit as claimed in claim 12, wherein When (syncback_clk_a_gat_en|syncback_clk_b_gat_en) is true, the clock switching control unit 225 continuously operates in the switch status, the storing signal equals to one (mux_sel_hold=1), the first enable signal equals to zero (clk_a_gat_en=0), and the second enable signal equals to zero (clk_b_gat_en=0).

17. The clock switching circuit as claimed in claim 12, wherein when the clock switching control unit detects the clock switching signal (clk_sel) changing, the clock switching unit switches operation from the idle status to the switch status.

18. The clock switching circuit as claimed in claim 12, wherein when the clock switching control unit detects clock switching signal (clk_sel) changes, the clock switching control device uses the first enable signal (clk_a_gat_en) and the second enable signal (clk_b_gat_en) to control the first clock gate control unit and the second clock gate control unit to stop output of the third clock signal (clk_a_gated) and the fourth clock signal (clk_b_gated) to the multiplexer, after which, the multiplexer switches according to the clock switching storing signal (mux_sel), then the first clock gate control unit and the second clock gate control unit respectively outputs the third clock signal (clk_a_gated) and the fourth clock signal (clk_b_gated) to the multiplexer, and then the multiplexer outputs the third clock signal (clk_a_gated) corresponding to the first clock signal (clk_a) or the fourth clock signal (clk_b_gated) corresponding to the second clock signal (clk_b) according to the clock switching storing signal (mux_sel).

* * * * *